Feb. 7, 1928.

J. F. BRADY 1,658,589

MOTH TRAP

Filed April 11, 1927

James F. Brady INVENTOR

BY

A. G. Burns ATTORNEY

Patented Feb. 7, 1928.

1,658,589

UNITED STATES PATENT OFFICE.

JAMES F. BRADY, OF SOUTH MILFORD, INDIANA.

MOTH TRAP.

Application filed April 11, 1927. Serial No. 182,702.

This invention relates to improvements in moth traps of that type in which a flame is used in conjunction with a reflector and oil lamp for attracting and destroying night flying insects. The object of the improvement is to provide a construction including a torch and an oil pan having reflecting means in connection therewith, so arranged that the pan and reflecting means may be readily removed from the torch and replaced after emptying the pan. Another object is to so arrange the reflecting means and the pan so that when the torch is in position for use, the flame of the torch will be disposed at a point closely adjacent to the surface of the oil in the pan.

These objects are accomplished by the construction illustrated in the accompanying drawings, in which:—

The characters appearing in the description refer to parts shown in the drawings and designated thereon by corresponding characters.

Figure 1:
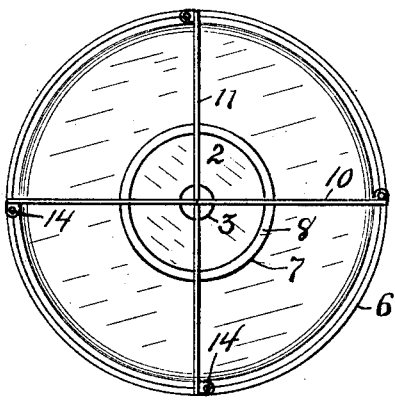
Fig. 1 is a plan view of a structure embodying the invention.
Figure 2:
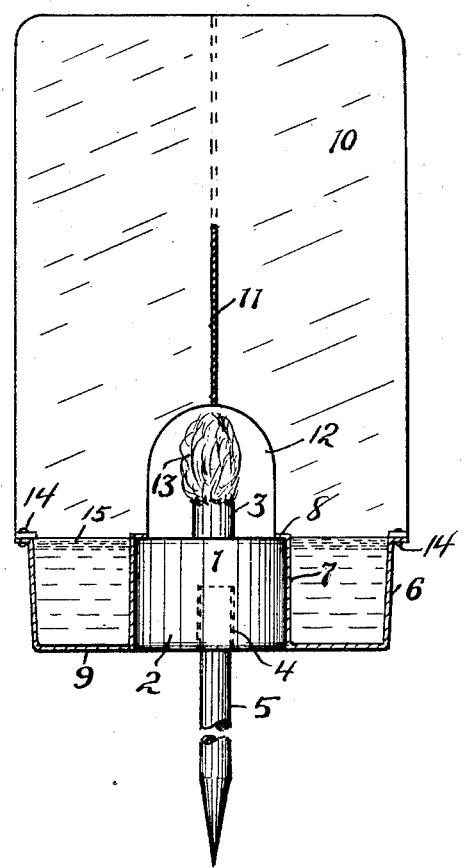
Fig. 2 is an elevation projected from Fig. 1, parts being in section.

The invention consists of a torch 1 having a cylindrical oil reservoir 2 and a burner 3. In the bottom of the reservoir is a socket 4 for the reception of the top of a stake 5 by which the torch receives support.

Surrounding the reservoir is a catch pan 6 having in its center a cylindrical wall 7 with an internal annular flange 8 at its top, the flange being in a plane slightly above the brim of the pan. The bottom 9 of the pan is in the form of an annular ring, the inner periphery of which is united with the lower end of the inner wall 7 of the pan, and the reservoir 2 of the torch is received through the bottom of the pan and encompassed by the wall 7, with the flange 8 thereof resting upon the top of the reservoir, thereby affording support for the pan upon the torch.

Upon the top of the pan are mounted two reflecting plates 10 and 11, vertically disposed, the one being arranged at right angles to the other, each of said plates having made in its lower end at its middle portion an opening 12, which openings afford space for the flame 13 of the torch. Each plate is secured, at its lower end at each side thereof, to the brim of the pan by any suitable means such as rivets 14.

By this construction the catch-pan and the reflecting plates attached thereto may be lifted bodily from the torch to permit emptying of the pan and polishing of the reflector plates, as well as the refilling of the reservoir of the torch.

A feature of the invention is that the reservoir for the torch is encompassed by the catch-pan, with the top of the reservoir confined at or below the level of the brim of the catch-pan, so that the plane of the burner is located in close proximity to the level of liquid 15 with which the catch-pan is filled. By this arrangement the power of reflection of the flame of the torch from the surface of the liquid in the catch-pan is greatly enhanced, with corresponding effectiveness in luring the insects.

The liquid 15 with which the catch-pan is filled may be any such substance as is ordinarily employed for the purpose of captivating and stifling insects. For example, the catch-pan may be partially filled with water and subsequently filled to the level of its brim with a stratum of crude or coal oil.

In utilizing the invention the torch is mounted upon the stake which is driven in the ground, or may be placed directly upon the ground, and the catch-pan with the reflecting plates attached are positioned on the torch. Upon lighting the torch, the light of the flame is reflected from the plates as well as from the surface of the liquid in the catch-pan, which attracts the flying insects into contact with the plates and the liquid. Upon striking the plates the insects are stunned and dropped bodily into the liquid. When the catch-pan becomes overloaded with insects it is removed from the torch and emptied by grasping and lifting the plates.

What I claim is:—

1. A moth trap comprising a torch having a reservoir and burner therefor; a catch-pan having concentric walls, the inner wall having an internal flange at its top in a plane slightly above the brim of the pan, the bottom of the pan being open for the reception of the reservoir, said flange being so disposed as to bear upon the top of the reservoir and afford support thereon for the pan; reflecting plates disposed in vertical planes at angles to each other and attached at their lower ends to said pan, each plate having in its lower end in the middle portion thereof an opening for the flame of such torch; and a stake in connection with the reservoir for the support of the device.

2. A moth trap comprising a torch having a reservoir and burner therefor; a catch-pan having concentric walls, the inner wall having an internal flange at its top in a plane slightly above the brim of the pan, the bottom of the pan being open for the reception of the reservoir, said flange being so disposed as to bear upon the top of the reservoir and afford support thereon for the pan; and reflecting plates disposed in vertical planes at angles to each other and attached at their lower ends to said pan, each plate having in its lower end in the middle portion thereof an opening for the flame of such torch.

In testimony whereof I affix my signature.

JAMES F. BRADY.